US011283247B2

(12) United States Patent
Yang et al.

(10) Patent No.: US 11,283,247 B2
(45) Date of Patent: Mar. 22, 2022

(54) CARRIER MECHANISM FOR WALKING ON LINE

(71) Applicant: INSTITUTE OF AUTOMATION, CHINESE ACADEMY OF SCIENCES, Beijing (CN)

(72) Inventors: Guodong Yang, Beijing (CN); Xiaoyu Long, Beijing (CN); Weiqing Zhao, Beijing (CN); En Li, Beijing (CN); Zize Liang, Beijing (CN); Fengshui Jing, Beijing (CN); Han Wang, Beijing (CN); Hao Wang, Beijing (CN); Zishu Gao, Beijing (CN); Yunong Tian, Beijing (CN); Yuansong Sun, Beijing (CN); Sixi Lu, Beijing (CN); Guangyao Xu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/298,607

(22) PCT Filed: Nov. 12, 2019

(86) PCT No.: PCT/CN2019/117495
§ 371 (c)(1),
(2) Date: May 31, 2021

(87) PCT Pub. No.: WO2021/088102
PCT Pub. Date: May 14, 2021

(65) Prior Publication Data
US 2022/0045489 A1 Feb. 10, 2022

(30) Foreign Application Priority Data
Nov. 8, 2019 (CN) .......................... 201911085322.X

(51) Int. Cl.
H02G 1/02 (2006.01)
B25J 5/02 (2006.01)
(Continued)

(52) U.S. Cl.
CPC .................. H02G 1/02 (2013.01); B25J 5/02 (2013.01); B61B 7/06 (2013.01); H02G 7/16 (2013.01)

(58) Field of Classification Search
CPC ... H02G 1/02; H02G 1/16; H02G 7/16; B61B 7/06; B61B 12/00; B25J 5/02
(Continued)

(56) References Cited

U.S. PATENT DOCUMENTS 7,552,684 B2 * 6/2009 Montambault ........... B61B 7/06
104/112
10,714,913 B2 * 7/2020 Temple .................. H01B 19/04
(Continued)

FOREIGN PATENT DOCUMENTS

CN 1853873 A 11/2006
CN 101104265 A 1/2008
(Continued)

Primary Examiner — Zachary L Kuhfuss
(74) Attorney, Agent, or Firm — Bayramoglu Law Offices LLC

(57) ABSTRACT

A carrier mechanism for walking on a line includes a carrier platform constituted by a first mounting plate, a second mounting plate and a longitudinal movable plate, a walking apparatus, a clamping apparatus, a driving apparatus, and a self-balance control apparatus configured to adjust a posture of the carrier mechanism. The longitudinal movable plate is slidably arranged on the second mounting plate fixedly connected to the first mounting plate in parallel. The walking apparatus includes at least two sets of walking wheels arranged along a walking direction. The clamping apparatus is slidably arranged on the lower side of the longitudinal movable plate. The driving apparatus includes a first driving (Continued)

apparatus configured to drive the walking wheels to roll, and a second driving apparatus configured to drive the longitudinal movable plate to move. The clamping apparatus is driven by the longitudinal movable plate to clamp or release a to-be-inspected target.

16 Claims, 4 Drawing Sheets

(51) Int. Cl.
    *B61B 7/06*     (2006.01)
    *H02G 7/16*     (2006.01)

(58) Field of Classification Search
    USPC .............................. 104/112, 229; 901/1, 44
    See application file for complete search history.

(56) References Cited

U.S. PATENT DOCUMENTS

| | | | |
|---|---|---|---|
| 2011/0196535 A1* | 8/2011 | Phillips .................. | B60K 16/00 700/259 |
| 2011/0196536 A1* | 8/2011 | Phillips .................. | H02G 1/02 700/259 |

FOREIGN PATENT DOCUMENTS

| | | |
|---|---|---|
| CN | 101698298 A | 4/2010 |
| CN | 101752818 A | 6/2010 |
| CN | 202137762 U | 2/2012 |
| CN | 202952262 U | 5/2013 |
| CN | 103586861 A | 2/2014 |
| CN | 103746318 A | 4/2014 |
| CN | 104742110 A | 7/2015 |
| CN | 204505243 U | 7/2015 |
| CN | 205051255 U | 2/2016 |
| CN | 105429051 A | 3/2016 |
| CN | 106099744 A | 11/2016 |
| CN | 106239474 A | 12/2016 |
| CN | 107623282 A | 1/2018 |
| CN | 108544463 A | 9/2018 |
| CN | 108582100 A | 9/2018 |
| CN | 108988204 A | 12/2018 |
| CN | 109066464 A | 12/2018 |
| CN | 208323400 U | 1/2019 |
| CN | 110142739 A | 8/2019 |
| CN | 110190554 A | 8/2019 |
| JP | H05199629 A | 8/1993 |
| JP | H1189033 A | 3/1999 |
| KR | 20120013680 A | 2/2012 |
| KR | 20120015680 A | 2/2012 |
| KR | 20150004980 A | 1/2015 |

* cited by examiner

CARRIER MECHANISM FOR WALKING ON LINE

CROSS REFERENCE TO THE RELATED APPLICATIONS

This application is the national phase entry of International Application No. PCT/CN2019/117495, filed on Nov. 12, 2019, which is based upon and claims priority to Chinese Patent Application No. 201911085322.X, filed on Nov. 8, 2019, the entire contents of which are incorporated herein by reference.

TECHNICAL FIELD

The present invention relates to the field of special robots, and more particularly, to a carrier mechanism for walking on a line.

BACKGROUND

With the development of robot technologies, there are automation and intelligence demands for all industries, especially for inspection industries such as transmission line inspection, pipeline inspection, and railway inspection. The above inspection objects are generally linear objects such as overhead transmission lines and high-speed railway distribution networks, or tubular objects such as oil and gas pipelines and feeding pipelines. At present, most inspection robots in the prior art typically adopt a cantilevered structure. When encountering experience external interference, it is easy to cause serious shaking and swaying between the cantilevered structure and the to-be-inspected targets. With respect to inspection of this kind of linear or tubular objects, no desired inspection carrier is available to ensure stability when the robot walks on a line, failing to simultaneously ensure both efficiency and stability.

SUMMARY

In order to solve the above problem in the prior art and ensure the walking stability of a walking mechanism on a line, the present invention provides a carrier mechanism for walking on a line, including a carrier platform, a walking apparatus, a clamping apparatus, a driving apparatus, and a self-balance control apparatus. The carrier platform includes a first mounting plate, a second mounting plate and a longitudinal movable plate. The first mounting plate is fixedly connected to the second mounting plate in parallel. The longitudinal movable plate is arranged between the first mounting plate and the second mounting plate in parallel, and the longitudinal movable plate is slidably arranged on the second mounting plate. The walking apparatus is arranged on the lower side of the second mounting plate, and the walking apparatus includes at least two sets of walking wheels. The plurality of sets of walking wheels are successively arranged along a direction of a longitudinal center line of the carrier mechanism, and a walking direction of the walking wheels is consistent with the direction of the longitudinal center line of the carrier mechanism. The clamping apparatus is slidably arranged on the lower side of the longitudinal movable plate. The driving apparatus includes a first driving apparatus and a second driving apparatus, and both the first driving apparatus and the second driving apparatus are fixedly arranged on the first mounting plate. The self-balance control apparatus is arranged on the first mounting plate and configured to maintain a posture balance of the carrier mechanism. In a working process, the second driving apparatus drives the longitudinal movable plate to move forward along the longitudinal center line of the carrier mechanism, and drives the clamping apparatus to clamp a to-be-inspected target. The first driving apparatus drives the walking wheels to roll on the to-be-inspected target. The self-balance control apparatus detects posture information of walking of the carrier mechanism, and adjusts a posture of the carrier mechanism to ensure a walking balance of the carrier mechanism on the to-be-inspected target.

In some preferred embodiments, the longitudinal movable plate is provided with four guide grooves, and the four guide grooves are symmetrically arranged on the left side and the right side of a longitudinal center line of the carrier platform. The guide grooves vertically penetrate the longitudinal movable plate, and the clamping apparatus is slidably connected to the guide grooves. The clamping apparatus is driven by the guide grooves to move reversely relative to the longitudinal movable plate.

In some preferred embodiments, the clamping apparatus includes a clamping mechanism and a clamping bracket. The clamping mechanism is fixedly arranged at a lower end of the clamping bracket. An upper end of the clamping bracket is slidably connected to the guide groove. Four clamping apparatus are provided, and the four clamping apparatus are symmetrically arranged on the left side and the right side of the longitudinal center line of the carrier platform. Each pair of clamping apparatus are driven by the second driving apparatus to clamp inward or release outward the to-be-inspected target.

In some preferred embodiments, the second driving apparatus includes a second driving motor and a second orthogonal helical gear set. The second orthogonal helical gear set includes a second driving gear and a second driven gear. The second driving gear is fixedly connected to a power output end of the driving motor, and the second driven gear is engaged with the second driving gear for transmission.

In some preferred embodiments, the second driving apparatus further includes a second transmission mechanism. The second transmission mechanism includes an upper gear and an upper toothed rack. The upper gear is coaxially and fixedly connected to the second driven gear. The upper toothed rack is fixedly arranged on the longitudinal movable plate, and the upper toothed rack is engaged with the upper gear for transmission.

In some preferred embodiments, the first driving apparatus includes a first driving motor and a first orthogonal helical gear set. The first orthogonal helical gear set includes a first driving gear and a first driven gear. The first driving gear is fixedly connected to a power output end of the driving motor, and the first driven gear is engaged with the first driving gear for transmission.

The first driving apparatus further includes a first transmission mechanism. The first transmission mechanism includes a first gear, a second gear, and a first transmission shaft. A power output end of the first driving apparatus is fixedly connected to the first gear, and the first gear is drivingly connected to the second gear through a gear belt. The second gear is fixedly arranged at one end of the first transmission shaft, and the first transmission shaft is coaxially and fixedly connected to the walking wheels.

In some preferred embodiments, the walking apparatus further includes a support frame and a synchronous pulley. The synchronous pulley is coaxially and fixedly connected to the walking wheel, and the synchronous pulley is rotatably connected to the support frame through the first transmission shaft. The walking wheel is arranged between the second gear and the synchronous pulley.

In some preferred embodiments, the walking apparatus includes at least two sets of synchronous pulleys, and the plurality of sets of synchronous pulleys are successively arranged along a walking direction of the carrier mechanism, and are connected through a synchronous belt.

The plurality of sets of walking wheels include one driving wheel and one or more driven wheels.

The plurality of sets of synchronous pulleys include one driving synchronous pulley and one or more driven synchronous pulleys.

The driving wheel is coaxially and fixedly connected to the driving synchronous pulley, and the driven wheel is coaxially and fixedly connected to the driven synchronous pulley. The driving wheel drives the driven synchronous pulley to rotate through the driving synchronous pulley and the synchronous belt.

In some preferred embodiments, the carrier mechanism further includes an upper sliding rail. Two upper sliding rails are provided, and the two upper sliding rails are symmetrically arranged on both sides of a longitudinal center line of the longitudinal movable plate. The upper sliding rail is slidably connected to a side surface of the longitudinal movable plate. The upper sliding rail further includes a support shaft. An upper end of the support shaft is fixedly arranged on the upper sliding rail, and a lower end of the support shaft is fixedly arranged on the second mounting plate.

In some preferred embodiments, the longitudinal movable plate further includes a position limiting sensor, and the position limiting sensor is fixedly arranged on the longitudinal movable plate. The first mounting plate further includes a position limiting sensor stopper, and the position limiting sensor stopper is fixedly arranged on the lower side of the first mounting plate. When the clamping apparatus clamps the to-be-inspected target, the stopper arranged on the lower side of the first mounting plate is in contact with the position limiting sensor, and limits the movement of the longitudinal movable plate.

The present invention has the following advantages.

1) The present invention provides a carrier mechanism for walking on a line. As a carrier, the carrier mechanism can be used to carry a monitoring apparatus, a maintenance apparatus, or a line inspection robot to operate on a high-voltage line, a tunnel pipeline, and other line-like and tubular objects. A carrier platform, a walking apparatus, a clamping apparatus, and a self-balance control apparatus cooperate to effectively ensure the walking stability of the carrier mechanism.

2) A driving apparatus and other related apparatus are arranged above a to-be-inspected target, so that the carrier platform can be easily used in combination with an aircraft to carry the aircraft to perform inspection on the target. In this way, there is no need to manually help the carrier mechanism to reach the designated target, so that a line inspection robot walks onto a line automatically and operates stably in the future.

BRIEF DESCRIPTION OF THE DRAWINGS

Other features, objectives and advantages of the present invention will become apparent upon reading the detailed description of the non-restrictive embodiments with reference to the following drawings.

Figure 1:
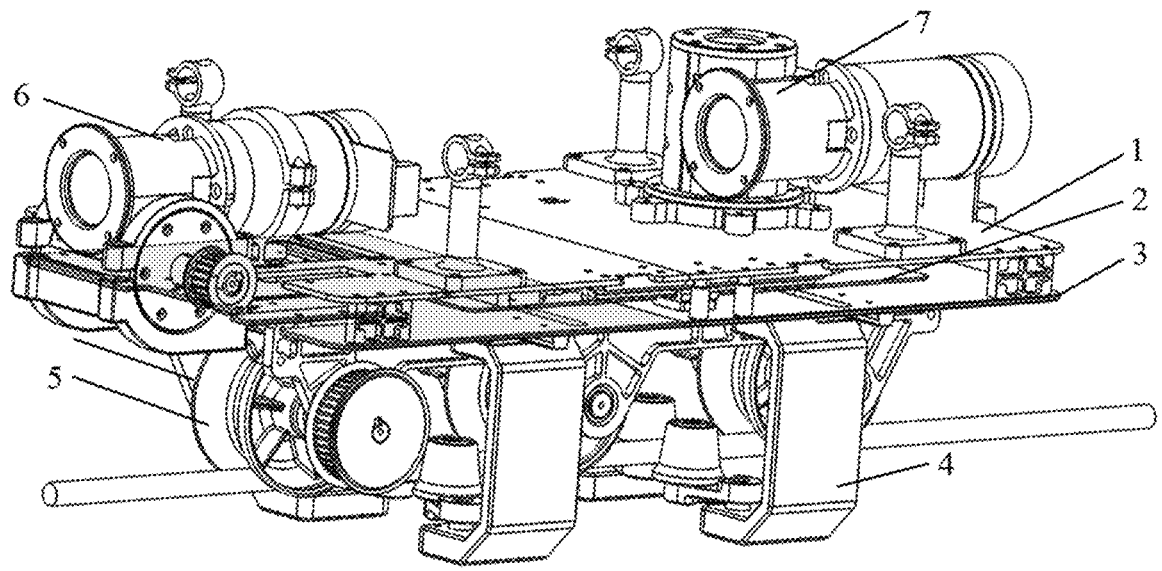
FIG. 1 is a perspective view of an overall structure of an embodiment of the present invention.

In the figures: 1. first mounting plate; 2. longitudinal movable plate; 21. plate body; 22. through groove; 23. upper toothed rack; 24. guide groove; 25. position limiting sensor; 3. second mounting plate; 4. clamping apparatus; 41. clamping drive shaft; 42. clamping bracket; 43. clamping connection member; 44. clamping mechanism; 5. walking apparatus; 51. support frame; 52. walking wheel; 53. synchronous pulley; 54. tensioning pulley; 6. first driving apparatus; 61. first driving motor; 62. first orthogonal helical gear set; 7. second driving apparatus; 8. upper sliding rail; 9. support shaft; 10. lower sliding rail.

DETAILED DESCRIPTION OF THE EMBODIMENTS

The preferred embodiments of the present invention are described below with reference to the drawings. Those skilled in the art should understand that the embodiments herein are merely intended to explain the technical principles of the present invention, rather than to limit the scope of protection of the present invention.

The present invention provides a carrier mechanism for walking on a line, including a carrier platform, a walking apparatus, a clamping apparatus, a driving apparatus, and a self-balance control apparatus. The carrier platform includes a first mounting plate, a second mounting plate and a longitudinal movable plate. The first mounting plate is fixedly connected to the second mounting plate in parallel through vertical shaft. The longitudinal movable plate is arranged between the first mounting plate and the second mounting plate in parallel, and the longitudinal movable plate is slidably arranged on the second mounting plate. The walking apparatus is arranged on the lower side of the second mounting plate. The walking apparatus includes at least two sets of walking wheels. The plurality of sets of walking wheels are successively arranged along a direction of a longitudinal center line of the carrier mechanism, and a walking direction of the walking wheels is consistent with the direction of the longitudinal center line of the carrier mechanism. The clamping apparatus is slidably arranged on the lower side of the longitudinal movable plate. The driving apparatus includes a first driving apparatus and a second driving apparatus, and both the first driving apparatus and the second driving apparatus are fixedly arranged on the first mounting plate. The first driving apparatus is configured to drive the walking wheels to roll on a to-be-inspected target. The second driving apparatus is configured to drive the longitudinal movable plate to move forward or backward along the longitudinal center line of the carrier mechanism, and drive the clamping apparatus to clamp or release the to-be-inspected target. The self-balance control apparatus is arranged on the carrier platform, and is configured to adjust a posture of the carrier mechanism. The carrier mechanism is configured as a platform to carry various detection devices to monitor the to-be-inspected target.

In a working process, the self-balance control apparatus can receive an external instruction to control the first driving apparatus and the second driving apparatus. The first driving apparatus is configured to drive the walking wheels to roll on the to-be-inspected target. The second driving apparatus drives the longitudinal movable plate to move forward along the longitudinal center line of the carrier mechanism, and drives the clamping apparatus to clamp the to-be-inspected target. In the prior art, a cantilevered structure is typically employed. Therefore, regardless of a line inspection robot or a line inspection carrier mechanism, the center of gravity is generally on the lower side of the to-be-inspected target, the result being that the object cannot be carried stably. As unmanned aerial vehicle (UAV) technologies in the prior art have become increasingly mature, inspection of pipeline-like targets such as high-voltage lines or tunnels in a complex and dangerous environment has become a difficult problem to be overcome by the line inspection robot in the future. The carrier mechanism provided in the present invention can be combined with a UAV in addition to carrying monitoring and maintenance apparatus. The carrier platform of the carrier mechanism of the present invention can be provided with an apparatus connected to the UAV, and the UAV carries the carrier mechanism to land on the to-be-inspected target for operation monitoring. The carrier mechanism for walking on a line in the present invention is not limited to high-voltage lines and other high-altitude linear objects, and can also be used for pipelines of underground tunnels.

The present invention is further described with reference to the drawings and specific embodiments.

FIG. 1 is a perspective view of the structure of the present invention, wherein a self-balance control apparatus is not shown. The carrier mechanism includes a carrier platform, the clamping apparatus 4, the walking apparatus 5, the first driving apparatus 6, and the second driving apparatus 7. The carrier platform includes the first mounting plate 1, the second mounting plate 3, and the longitudinal movable plate 2. The first mounting plate 1 is fixedly connected to the second mounting plate 3 in parallel through vertical shafts. There are a plurality of vertical shafts. The plurality of vertical shafts are symmetrically arranged on the left side and the right side of a longitudinal center line of the carrier mechanism, and the vertical shafts are arranged at four end corners of the second mounting plate. The longitudinal movable plate is arranged between the first mounting plate and the second mounting plate in parallel, and the longitudinal movable plate is slidably arranged relative to the second mounting plate.

The walking apparatus 5 is arranged on the lower side of the second mounting plate 3. The walking apparatus 5 includes at least two sets of walking wheels provided with annular grooves in a circumferential direction. The plurality of sets of walking wheels are successively arranged along a direction of the longitudinal center line of the carrier mechanism, and a walking direction of the walking wheels is consistent with the direction of the longitudinal center line of the carrier mechanism, which ensures that a walking axis of the walking wheels and a longitudinal center line of a to-be-inspected target are in an identical plane in the vertical direction. The outline in the middle of the grooves of the walking wheels is adapted to the surface of the to-be-inspected target. When the to-be-inspected target is a thin object such as a high-voltage line, the linear target is clamped in the groove of the walking wheel to improve the walking stability of the carrier mechanism. When the to-be-inspected target is a thick tubular object in a tunnel, a semicylindrical surface adapted to a tubular surface is formed in the middle of the groove of the walking wheel, to improve the walking stability of the carrier mechanism on the to-be-inspected target as well.

The clamping apparatus 4 is slidably arranged on the lower side of the longitudinal movable plate 2. The second mounting plate is provided with a groove that does not interfere with sliding of the clamping apparatus 4 in the longitudinal movable plate 2. The clamping apparatus 4 is slidably connected relative to the carrier platform. Four clamping apparatus are provided, and the four clamping apparatus are symmetrically arranged on the left side and the right side of a longitudinal center line of the carrier platform. In a working state, the four clamping apparatus clamp the to-be-inspected target, and a position at which each clamping device clamps the to-be-inspected target is located between two adjacent walking wheels. The clamping apparatus cooperates with the walking apparatus in the working state to ensure the balance and stability of the carrier mechanism when the carrier mechanism walks on the line. Both the first driving apparatus 6 and the second driving apparatus 7 are fixedly arranged on the first mounting plate. Each pair of clamping apparatus is driven by the second driving apparatus to clamp inward or release outward the to-be-inspected target. The self-balance control apparatus not shown in the figure is arranged on the first mounting plate, and is configured to adjust a posture of the carrier mechanism.

In a working process, the second driving apparatus drives the longitudinal movable plate to move forward along the longitudinal center line of the carrier mechanism, and drives the clamping apparatus to clamp the to-be-inspected target. The first driving apparatus drives the walking wheels to roll on the to-be-inspected target. The self-balance control apparatus detects the posture information of the carrier mechanism, and adjusts the posture of the carrier mechanism to further ensure the walking balance of the carrier mechanism on the to-be-inspected target. In other words, in a walking process, the walking apparatus and the clamping apparatus cooperate with each other to ensure the walking stability of the carrier mechanism. When encountering external wind interference or other interference or lateral resistance during walking, the self-balance control apparatus can constantly monitor the posture information of the carrier mechanism, and further assist adjusting the posture of the carrier mechanism to ensure the balance of the carrier mechanism. The self-balance control apparatus includes a controller (intelligent chip), a posture sensor (gyroscope), and an actuator (motor) to realize balance. When the carrier platform inclines during walking on the line, the posture sensor outputs the corresponding posture information. After receiving the posture information, the controller sends a signal to the motor, and controls the motor to rotate in a corresponding direction. The posture sensor continuously monitors the posture of the carrier mechanism at a certain frequency, and outputs the posture information to the controller. The controller adjusts a rotation direction and speed of the motor in real time according to the posture information of the carrier mechanism in operation, so as to ensure the carrying balance of the carrier mechanism on the to-be-inspected target. A specific method for controlling the self balance by the self-balance control apparatus is not within the scope of the description of the present invention, and may be implemented by those skilled in the art using a well-known technology.

Moreover, in addition to the self-balance control apparatus, counterweights can also be arranged on both sides of the carrier mechanism to ensure that the center of gravity of the carrier mechanism is always located on the lower side of the longitudinal center line of the to-be-inspected target, and to ensure that the carrier mechanism can operate more stably and quickly on the to-be-inspected target.

It is understood by those skilled in the art that the vertical shafts may also be arranged at other positions of the first mounting plate and the second mounting plate, provided that the vertical shafts can support the first mounting plate and do not interfere with the movement and operation of the longitudinal movable plate, which is not described in detail herein.

Figure 2:
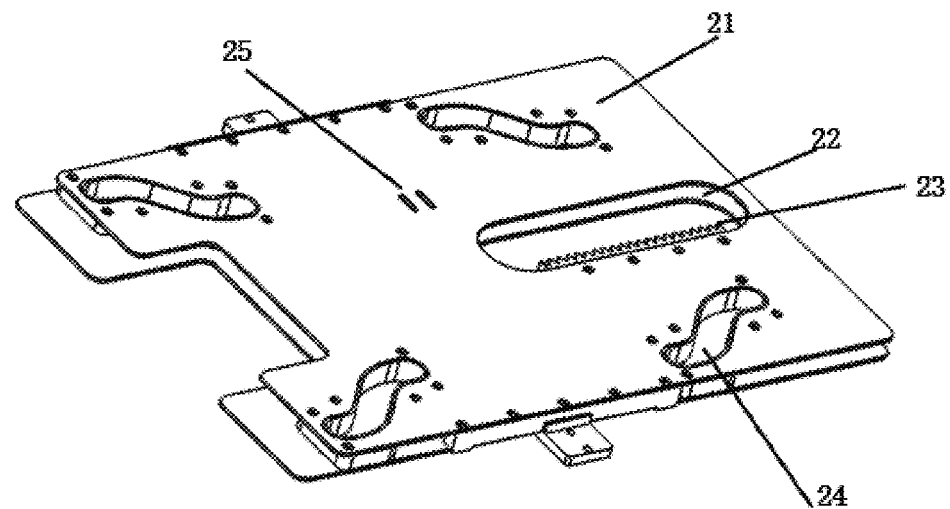
FIG. 2 is a structural schematic diagram of a longitudinal movable plate according to an embodiment of the present invention.

Further, FIG. 2 is a perspective view of the structure of the longitudinal movable plate. The longitudinal movable plate includes the plate body 21, the through groove 22, the upper toothed rack 23, the guide groove 24, and the position limiting sensor 25. The through groove 22 is arranged on a longitudinal center line of the plate body and penetrates the plate body. The upper toothed rack 23 is fixedly arranged in the through groove 22. Four guide grooves 24 are provided, and the four guide grooves 24 are symmetrically arranged on the left side and the right side of the longitudinal center line of the plate body. The guide grooves vertically penetrate the longitudinal movable plate. The guide grooves are S-shaped, and the guide grooves arranged on an identical side of the plate body are identical. The longitudinal movable plate further includes the position limiting sensor 25, and the position limiting sensor 25 is fixedly arranged on the longitudinal movable plate.

Figure 3:
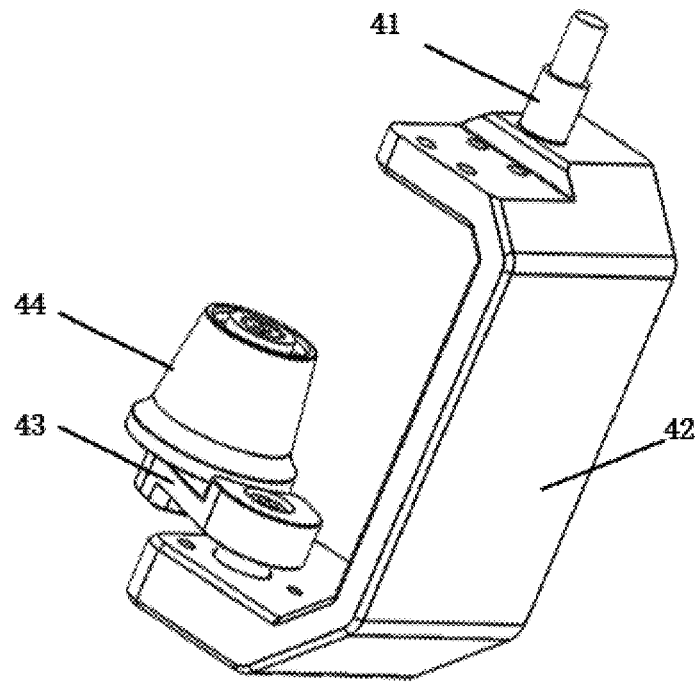
FIG. 3 is a structural schematic diagram of a clamping apparatus according to an embodiment of the present invention.

Further, FIG. 3 is a perspective view of the structure of the clamping apparatus. The clamping apparatus includes the clamping drive shaft 41, the clamping bracket 42, the clamping connection member 43, and the clamping mechanism 44. The clamping bracket 42 is C-shaped. The clamping drive shaft 41 is fixedly arranged above the clamping bracket 42. The clamping mechanism 44 is fixedly connected to the clamping bracket through the clamping connection member 43. The clamping mechanism 44 can rotate freely around its central axis to ensure that the carrier mechanism can still roll longitudinally along the to-be-inspected target when the clamping mechanism 44 is in a clamping state. In the present invention, the clamping mechanism 44 is in a shaped of a tapered column. In the working process, two clamping mechanisms arranged on both sides of the to-be-inspected target are configured to clamp the to-be-inspected target. It is understood by those skilled in the art that the clamping mechanism may also be arranged as an annular groove, provided that the structural design can be used to clamp the to-be-inspected target, which is not described in detail herein.

Figure 4:
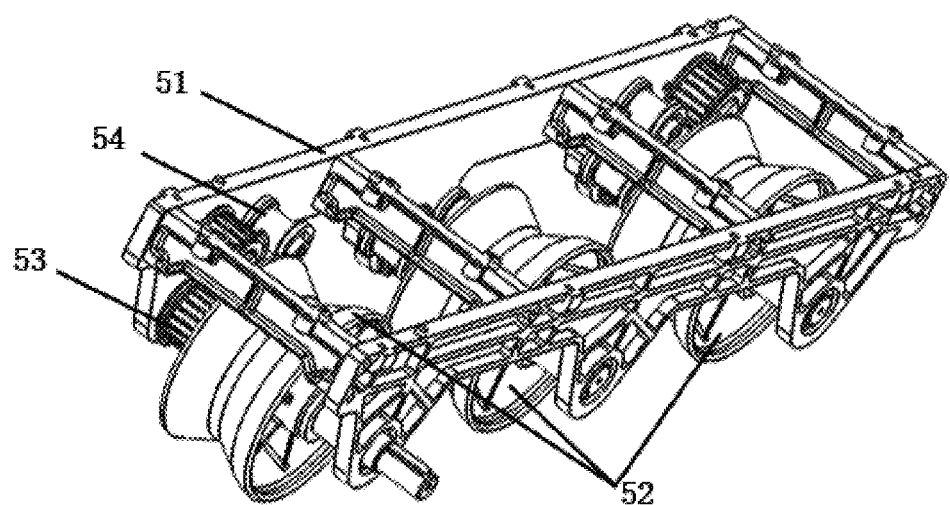
FIG. 4 is a structural schematic diagram of a walking apparatus according to an embodiment of the present invention.

Further, FIG. 4 is a perspective view of the structure of the walking apparatus. The walking apparatus includes the support frame 51, the walking wheels 52, the synchronous pulley 53, and the tensioning pulley 54. In an embodiment, three walking wheels 52 are provided, and the three walking wheels 52 are arranged along the longitudinal center line of the carrier mechanism. A connection line of longitudinal center lines of the walking wheels and the longitudinal center line of the carrier mechanism are in an identical plane in the vertical direction. In the present invention, the walking mechanism may be arranged as a deep-groove walking wheel to increase the area in contact with the to-be-inspected target. When the to-be-inspected target is a high-voltage line, the overall center of gravity of the carrier structure is lowered through the structural design and size design of the walking wheel in the walking mechanism, so as to further improve the walking stability of the carrier mechanism. The synchronous pulley 53 and the walking wheel 52 are coaxially fixedly arranged, and the synchronous pulley 53 is rotatably connected to the support frame 51 through a first transmission shaft. The walking apparatus includes three synchronous pulleys. The plurality of sets of synchronous pulleys are successively arranged along a walking direction of the carrier mechanism, and are connected through a synchronous belt. The plurality of sets of walking wheels include one driving wheel and one or more driven wheels. The plurality of sets of synchronous pulleys include one driving synchronous pulley and one or more driven synchronous pulleys. The driving wheel is coaxially and fixedly connected to the driving synchronous pulley, and the driven wheel is coaxially and fixedly connected to the driven synchronous pulley. The driving wheel drives the driven synchronous pulley to rotate through the driving synchronous pulley and the synchronous belt. In an embodiment, the first walking wheel arranged in a walking direction of the walking apparatus is the driving wheel, and the driving synchronous pulley is coaxially arranged with the driving wheel. The tensioning pulley is arranged above the three synchronous pulleys and is configured to tightly press the synchronous belt to ensure the tension of the synchronous belt in operation. During installation, the tensioning pulley is first loosened, then the synchronous belt is mounted, and next the tensioning pulley is mounted. Transmission by using the synchronous belt is stable and accurate, has no sliding in operation, and has characteristics of buffering and shock absorption, thereby further ensuring the accuracy and stability of the walking apparatus in operation.

Figure 5:
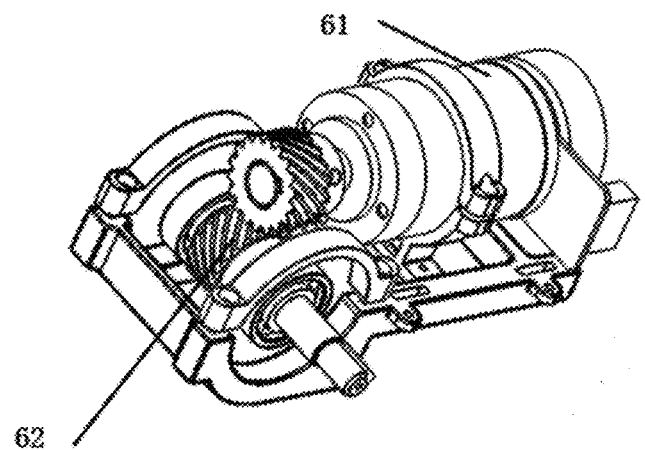
FIG. 5 is a structural schematic diagram of a first driving apparatus according to an embodiment of the present invention.

FIG. 5 is a perspective view of the structure of the first driving apparatus. The first driving apparatus includes the first driving motor 61 and the first orthogonal helical gear set 62. The first orthogonal helical gear set includes a first driving gear and a first driven gear. The first driving gear is fixedly connected to a power output end of the driving motor, and the first driven gear is engaged with the first driving gear for transmission.

Figure 6:
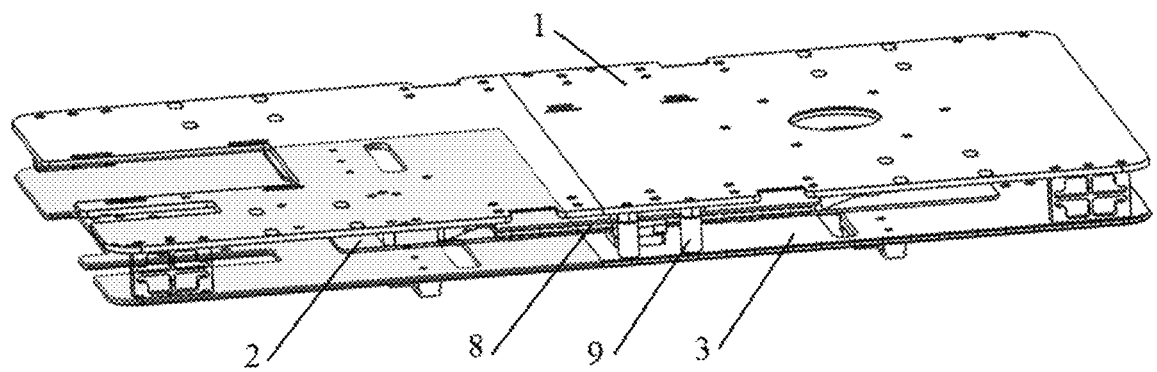
FIG. 6 is a structural schematic diagram of a carrier platform according to an embodiment of the present invention.

FIG. 6 is a structural schematic diagram of the carrier platform. The carrier platform includes the first mounting plate 1, the longitudinal movable plate 2, and the second mounting plate 3. The first mounting plate 1 is fixedly connected to the second mounting plate 3 in parallel through the vertical shafts. Upper sliding rails 8 are arranged on both sides of the longitudinal movable plate, respectively, and two upper sliding rails are arranged. The two upper sliding rails are symmetrically arranged on both sides of a longitudinal center line of the longitudinal movable plate. The upper sliding rail is fixedly connected to the second mounting plate through the support shaft 9. The upper sliding rail and the longitudinal movable plate can slide relative to each other. The first mounting plate further includes a position limiting sensor stopper, and the position limiting sensor stopper is fixedly arranged on the lower side of the first mounting plate. When the clamping apparatus clamps the to-be-inspected target, the stopper arranged on the lower side of the first mounting plate is in contact with the position limiting sensor fixedly arranged on the longitudinal movable plate, and limits the movement of the longitudinal movable plate.

Figure 7:
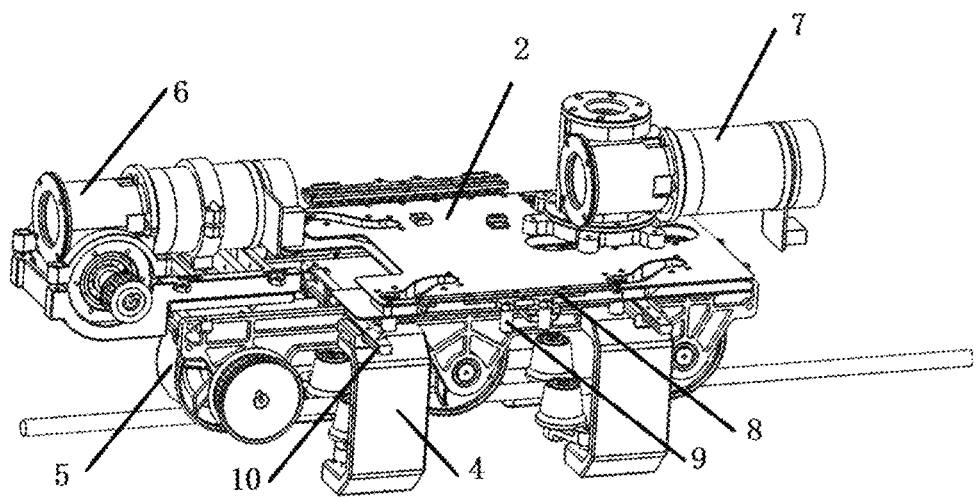
FIG. 7 is a structural schematic diagram of the clamping apparatus in a released state according to an embodiment of the present invention.

FIG. 7 is a structural schematic diagram of the clamping apparatus in a released state. The clamping apparatus 4 is slidably connected to the carrier mechanism through the lower sliding rail 10. The lower sliding rail 10 is slidably connected to a sliding block fixedly arranged on the clamping apparatus. The upper end of the clamping apparatus 4 can slide in the guide groove. The first driving apparatus 6 drives the walking apparatus through a first transmission mechanism. The first transmission mechanism includes a first gear, a second gear, and a first transmission shaft. A power output end of the first driving apparatus is fixedly connected to the first gear, and the first gear is drivingly connected to the second gear through a gear belt. The second gear is fixedly arranged at one end of the first transmission shaft. The first transmission shaft is coaxially and fixedly connected to the walking wheel.

Figure 8:
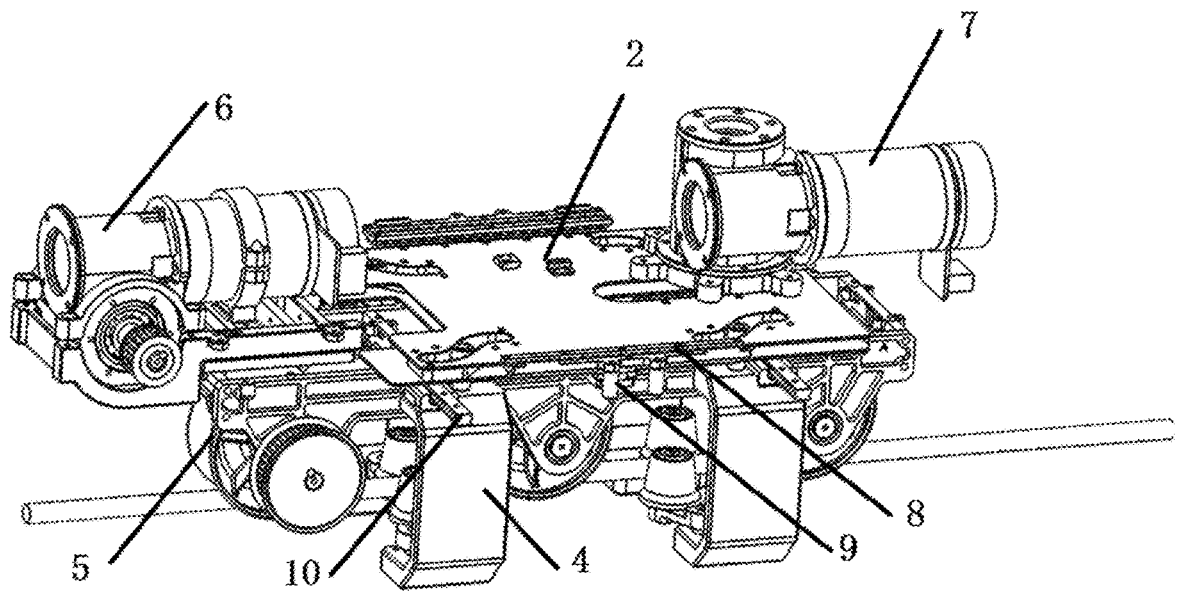
FIG. 8 is a structural schematic diagram of the clamping apparatus in a working state according to an embodiment of the present invention.
Figure 9:
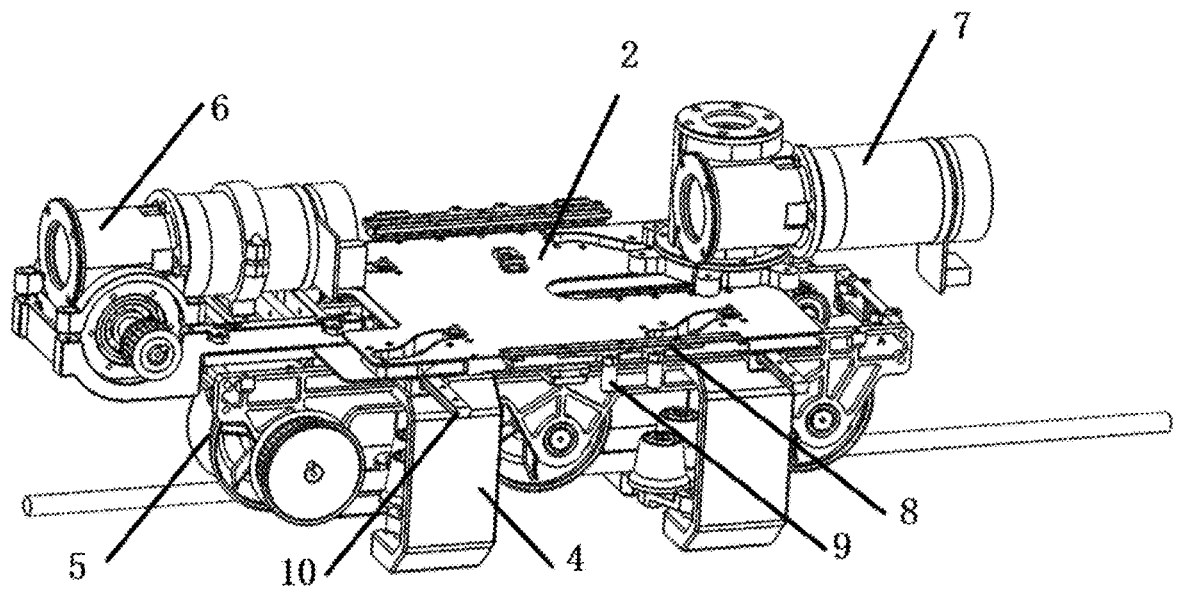
FIG. 9 is a structural schematic diagram of the clamping apparatus in a clamping state according to an embodiment of the present invention.

FIG. 8 is a structural schematic diagram of the clamping apparatus in a working state. FIG. 9 is a structural schematic diagram of the clamping apparatus in a clamping state. As shown in FIGS. 8 and 9, the second driving apparatus 7 drives the longitudinal movable plate to move through a second driving motor, a second orthogonal helical gear set and a second transmission mechanism arranged in the second driving apparatus 7. The longitudinal movable plate drives the clamping apparatus through the guide groove to move in the S-shaped guide groove along an opposite direction of a moving direction of the longitudinal movable plate, to further clamp the to-be-inspected target. Specifically, the second orthogonal helical gear set includes a second driving gear and a second driven gear. The second driving gear is fixedly connected to a power output end of the driving motor, and the second driven gear is engaged with the second driving gear for transmission. The second transmission mechanism includes an upper gear and an upper toothed rack. The upper gear is coaxially and fixedly connected to the second driven gear. The upper toothed rack is fixedly arranged on the longitudinal movable plate, and the upper toothed rack is engaged with the upper gear for transmission. When the position limiting sensor stopper arranged on the bottom side of the first mounting plate is in contact with the position limiting sensor arranged on the longitudinal movable plate, the longitudinal movable plate stops moving to further clamp the to-be-inspected target.

In the present invention, the second driving apparatus may further include two driving motors. The two driving motors can drive the clamping apparatus on respective sides. When the movement and self-balance control apparatus detects an unbalanced state based on the posture information of the carrier mechanism by using the posture sensor, the driving motor can also control the clamping apparatus on the side of the second driving apparatus separately to approach or move away from the to-be-inspected target, so as to adjust the center of gravity of the whole carrier mechanism, thereby ensuring the walking balance of the carrier mechanism on the to-be-inspected target.

Although the present invention has been described with reference to the preferred embodiments, various improvements may be made and components therein may be replaced with equivalents without departing from the scope of the present invention. In particular, as long as there is no structural conflict, the technical features in the embodiments can be combined in any way. The present invention is not limited to the specific embodiments disclosed herein, but shall include all technical solutions falling within the scope of the claims.

In the description of the present invention, terms such as "central", "upper", "lower", "left", "right", "vertical", "horizontal", "inner", and "outer" for indicating orientation or position relationships are based on the orientation or position relationships shown in the drawings. They are merely intended to facilitate description, rather than to indicate or imply that the apparatus or components must have the specific orientation or must be constructed and operated in the specific orientation. Therefore, these terms should not be constructed as a limitation to the present invention. Moreover, the terms such as "first", "second", and "third" are used only for description and are not intended to indicate or imply relative importance.

It should be further noted that, in the description of the present invention, unless otherwise clearly specified, meanings of terms "mount", "connect to", and "connection" should be understood in a broad sense. For example, the "connection" may be a fixed connection, a detachable connection, or an integral connection; it may be a mechanical connection or an electrical connection; it may be a direct connection, an indirect connection through an intermediate medium, or an internal connection between two components. Those skilled in the art can understand the specific meanings of the above terms in the present invention based on specific situations.

In addition, terms "include/comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

Hereto, the technical solutions of the present invention are described with reference to the preferred embodiments shown in the drawings. Those skilled in the art, however, should easily understand that the scope of protection of the present invention is obviously not limited to these specific embodiments. Those skilled in the art may make equivalent changes or replacements to the relevant technical features without departing from the principles of the present invention, but the technical solutions obtained after these changes or substitutions shall fall within the scope of protection of the present invention.

What is claimed is:

1. A carrier mechanism for walking on a line, comprising a carrier platform, a walking apparatus, a clamping apparatus, a driving apparatus, and a self-balance control apparatus; wherein the carrier platform comprises a first mounting plate, a second mounting plate and a longitudinal movable plate, wherein the first mounting plate is fixedly connected to the second mounting plate in parallel, the longitudinal movable plate is arranged between the first mounting plate and the second mounting plate in parallel, and the longitudinal movable plate is slidably arranged on the second mounting plate;

the longitudinal movable plate is provided with four guide grooves, and the four guide grooves are symmetrically arranged on a left side and a right side of a longitudinal center line of the carrier platform;

the guide grooves vertically penetrate the longitudinal movable plate, and the clamping apparatus is slidably connected to the guide grooves;

the clamping apparatus is driven by the guide grooves to move reversely relative to the longitudinal movable plate;

the walking apparatus is arranged on a lower side of the second mounting plate, and the walking apparatus comprises at least two sets of walking wheels, wherein the plurality of sets of walking wheels are successively arranged along a direction of the longitudinal center line of the carrier mechanism, and a walking direction of the walking wheels is consistent with the direction of the longitudinal center line of the carrier mechanism;

the clamping apparatus is slidably arranged on a lower side of the longitudinal movable plate;

the driving apparatus comprises a first driving apparatus and a second driving apparatus, wherein both the first driving apparatus and the second driving apparatus are fixedly arranged on the first mounting plate;

the self-balance control apparatus is arranged on the carrier platform, and is configured to adjust a posture balance of the carrier mechanism; and wherein, in a working process, the second driving apparatus drives the longitudinal movable plate to move forward along the longitudinal center line of the carrier mechanism, and drives the clamping apparatus to clamp a to-be-inspected target;

the first driving apparatus drives the walking wheels to roll on the to-be-inspected target;

the self-balance control apparatus detects posture information of walking of the carrier mechanism, and adjusts a posture of the carrier mechanism to ensure a walking balance of the carrier mechanism on the to-be-inspected target.

2. The carrier mechanism for walking on the line according to claim 1, wherein the clamping apparatus comprises a clamping mechanism and a clamping bracket;

the clamping mechanism is fixedly arranged at a lower end of the clamping bracket;

an upper end of the clamping bracket is slidably connected to the guide groove;

four clamping apparatus are provided, and the four clamping apparatus are symmetrically arranged on the left side and the right side of the longitudinal center line of the carrier platform; and each pair of clamping apparatus are driven by the second driving apparatus to clamp inward or release outward the to-be-inspected target.

3. The carrier mechanism for walking on the line according to claim 2, wherein the second driving apparatus comprises a second driving motor and a second orthogonal helical gear set;

the second orthogonal helical gear set comprises a second driving gear and a second driven gear;

the second driving gear is fixedly connected to a power output end of the second driving motor, and the second driven gear is engaged with the second driving gear for transmission.

4. The carrier mechanism for walking on the line according to claim 3, wherein the second driving apparatus further comprises a second transmission mechanism;

the second transmission mechanism comprises an upper gear and an upper toothed rack;

the upper gear is coaxially and fixedly connected to the second driven gear;

the upper toothed rack is fixedly arranged on the longitudinal movable plate, and the upper toothed rack is engaged with the upper gear for transmission.

5. The carrier mechanism for walking on the line according to claim 4, wherein the longitudinal movable plate further comprises a position limiting sensor, and the position limiting sensor is fixedly arranged on the longitudinal movable plate;

the first mounting plate further comprises a position limiting sensor stopper, and the position limiting sensor stopper is fixedly arranged on a lower side of the first mounting plate;

when the clamping apparatus clamps the to-be-inspected target, the position limiting sensor stopper arranged on the lower side of the first mounting plate is in contact with the position limiting sensor, and limits a movement of the longitudinal movable plate.

6. The carrier mechanism for walking on the line according to claim 3, wherein the longitudinal movable plate further comprises a position limiting sensor, and the position limiting sensor is fixedly arranged on the longitudinal movable plate;

the first mounting plate further comprises a position limiting sensor stopper, and the position limiting sensor stopper is fixedly arranged on a lower side of the first mounting plate;

when the clamping apparatus clamps the to-be-inspected target, the position limiting sensor stopper arranged on the lower side of the first mounting plate is in contact with the position limiting sensor, and limits a movement of the longitudinal movable plate.

7. The carrier mechanism for walking on the line according to claim 2, wherein the longitudinal movable plate further comprises a position limiting sensor, and the position limiting sensor is fixedly arranged on the longitudinal movable plate;

the first mounting plate further comprises a position limiting sensor stopper, and the position limiting sensor stopper is fixedly arranged on a lower side of the first mounting plate;

when the clamping apparatus clamps the to-be-inspected target, the position limiting sensor stopper arranged on the lower side of the first mounting plate is in contact with the position limiting sensor, and limits a movement of the longitudinal movable plate.

8. The carrier mechanism for walking on the line according to claim 1, wherein the first driving apparatus comprises a first driving motor and a first orthogonal helical gear set;

the first orthogonal helical gear set comprises a first driving gear and a first driven gear;

the first driving gear is fixedly connected to a power output end of the first driving motor, and the first driven gear is engaged with the first driving gear for transmission;

the first driving apparatus further comprises a first transmission mechanism;

the first transmission mechanism comprises a first gear, a second gear, and a first transmission shaft;

a power output end of the first driving apparatus is fixedly connected to the first gear, and the first gear is drivingly connected to the second gear through a gear belt; and the second gear is fixedly arranged at one end of the first transmission shaft, and the first transmission shaft is coaxially and fixedly connected to the walking wheels.

9. The carrier mechanism for walking on the line according to claim 8, wherein
the walking apparatus further comprises a support frame and a synchronous pulley;
the synchronous pulley is coaxially and fixedly connected to the walking wheel, and the synchronous pulley is rotatably connected to the support frame through the first transmission shaft; and
the walking wheel is arranged between the second gear and the synchronous pulley.

10. The carrier mechanism for walking on the line according to claim 9, wherein
the walking apparatus comprises at least two sets of synchronous pulleys, wherein the plurality of sets of synchronous pulleys are successively arranged along a walking direction of the carrier mechanism, and are connected through a synchronous belt;
the plurality of sets of walking wheels comprise one driving wheel and one or more driven wheels;
the plurality of sets of synchronous pulleys comprise one driving synchronous pulley and one or more driven synchronous pulleys; and
the driving wheel is coaxially and fixedly connected to the driving synchronous pulley, the driven wheel is coaxially and fixedly connected to the driven synchronous pulley, and the driving wheel drives the driven synchronous pulley to rotate through the driving synchronous pulley and the synchronous belt.

11. The carrier mechanism for walking on the line according to claim 10, wherein
the longitudinal movable plate further comprises a position limiting sensor, and the position limiting sensor is fixedly arranged on the longitudinal movable plate;
the first mounting plate further comprises a position limiting sensor stopper, and the position limiting sensor stopper is fixedly arranged on a lower side of the first mounting plate;
when the clamping apparatus clamps the to-be-inspected target, the position limiting sensor stopper arranged on the lower side of the first mounting plate is in contact with the position limiting sensor, and limits a movement of the longitudinal movable plate.

12. The carrier mechanism for walking on the line according to claim 9, wherein
the longitudinal movable plate further comprises a position limiting sensor, and the position limiting sensor is fixedly arranged on the longitudinal movable plate;
the first mounting plate further comprises a position limiting sensor stopper, and the position limiting sensor stopper is fixedly arranged on a lower side of the first mounting plate;
when the clamping apparatus clamps the to-be-inspected target, the position limiting sensor stopper arranged on the lower side of the first mounting plate is in contact with the position limiting sensor, and limits a movement of the longitudinal movable plate.

13. The carrier mechanism for walking on the line according to claim 8, wherein
the longitudinal movable plate further comprises a position limiting sensor, and the position limiting sensor is fixedly arranged on the longitudinal movable plate;
the first mounting plate further comprises a position limiting sensor stopper, and the position limiting sensor stopper is fixedly arranged on a lower side of the first mounting plate;
when the clamping apparatus clamps the to-be-inspected target, the position limiting sensor stopper arranged on the lower side of the first mounting plate is in contact with the position limiting sensor, and limits a movement of the longitudinal movable plate.

14. The carrier mechanism for walking on the line according to claim 1, further comprising an upper sliding rail; wherein
two upper sliding rails are provided, and the two upper sliding rails are symmetrically arranged on both sides of a longitudinal center line of the longitudinal movable plate;
the upper sliding rail is slidably connected to a side surface of the longitudinal movable plate;
the upper sliding rail further comprises a support shaft, wherein an upper end of the support shaft is fixedly arranged on the upper sliding rail, and a lower end of the support shaft is fixedly arranged on the second mounting plate.

15. The carrier mechanism for walking on the line according to claim 14, wherein
the longitudinal movable plate further comprises a position limiting sensor, and the position limiting sensor is fixedly arranged on the longitudinal movable plate;
the first mounting plate further comprises a position limiting sensor stopper, and the position limiting sensor stopper is fixedly arranged on a lower side of the first mounting plate;
when the clamping apparatus clamps the to-be-inspected target, the position limiting sensor stopper arranged on the lower side of the first mounting plate is in contact with the position limiting sensor, and limits a movement of the longitudinal movable plate.

16. The carrier mechanism for walking on the line according to claim 1, wherein
the longitudinal movable plate further comprises a position limiting sensor, and the position limiting sensor is fixedly arranged on the longitudinal movable plate;
the first mounting plate further comprises a position limiting sensor stopper, and the position limiting sensor stopper is fixedly arranged on a lower side of the first mounting plate;
when the clamping apparatus clamps the to-be-inspected target, the position limiting sensor stopper arranged on the lower side of the first mounting plate is in contact with the position limiting sensor, and limits a movement of the longitudinal movable plate.

* * * * *